United States Patent
Latreille

[15] 3,661,488
[45] May 9, 1972

[54] DEVICE FOR CUTTING PARISONS

[72] Inventor: Maurice Gaston Latreille, Batavia, Ill.
[73] Assignee: American Can Company, New York, N.Y.
[22] Filed: Apr. 13, 1970
[21] Appl. No.: 22,570

[52] U.S. Cl..................................425/196, 83/583, 83/636, 425/326, 425/297, 425/306
[51] Int. Cl........................................B29d 23/03
[58] Field of Search..........................18/5 BQ; 83/583, 636

[56] References Cited

UNITED STATES PATENTS

| | | | |
|---|---|---|---|
| 3,478,388 | 11/1969 | Turner | 18/5 BQ |
| 2,120,329 | 6/1938 | Henneke | 83/583 |
| 3,025,562 | 3/1962 | Nelson | 18/5 BQ |
| 3,456,290 | 7/1969 | Ruekberg | 18/5 BQ |
| 3,196,724 | 7/1965 | Frank | 83/583 X |

FOREIGN PATENTS OR APPLICATIONS

| | | | |
|---|---|---|---|
| 477,536 | 5/1929 | Germany | 83/583 |
| 814,591 | 3/1937 | France | 83/583 |

Primary Examiner—J. Spencer Overholser
Assistant Examiner—B. D. Tobor
Attorney—Robert P. Auber, George P. Ziehmer and Leonard R. Kohan

[57] ABSTRACT

A device for cutting a parison disposed between mold halves comprises a first cutting blade fixed to one of the mold halves and a second cutting blade pivotally mounted on the other mold half for pivotal movement generally in a plane parallel to the parting plane of the molds. The second cutting blade is biased to a predetermined pivotal position, whereby when the mold halves are closed, the first blade engages the second blade to pivot the latter in opposition to said bias and the said two blades produce a scissoring action operable to cut the parison disposed between the two blades.

10 Claims, 6 Drawing Figures

PATENTED MAY 9 1972 3,661,488
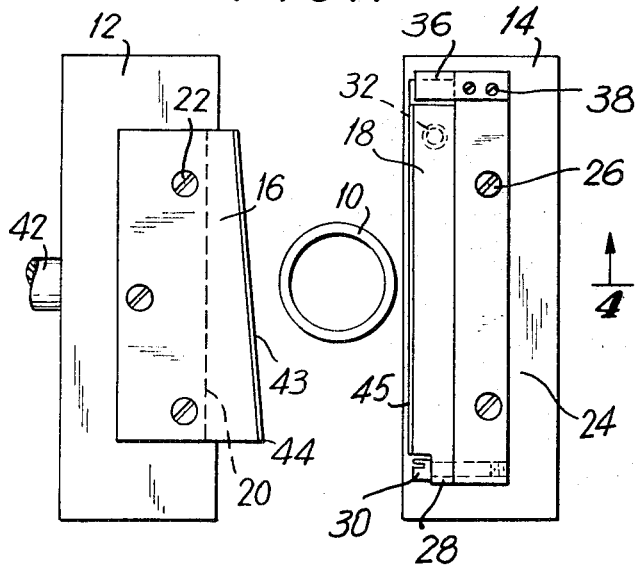
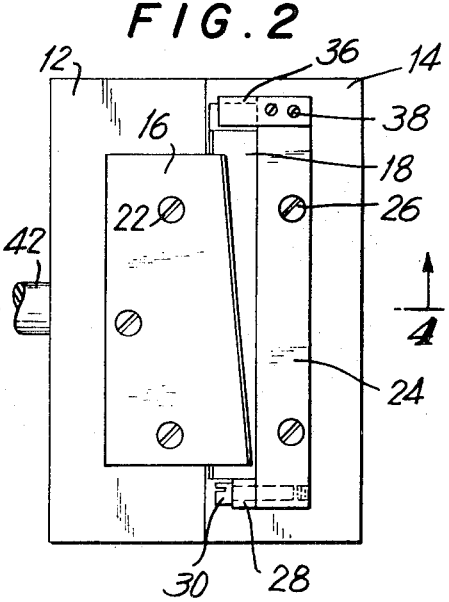
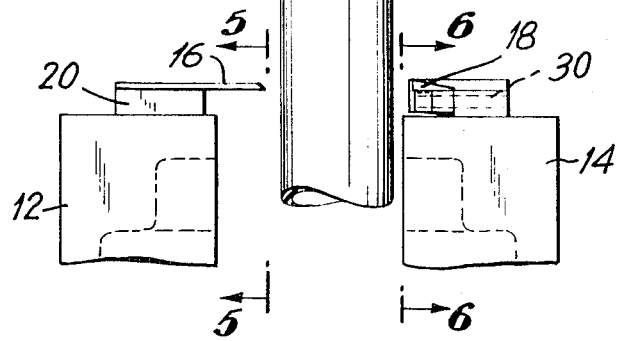
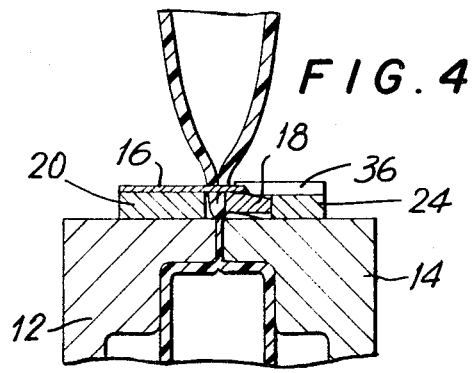
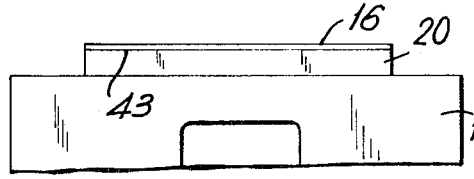
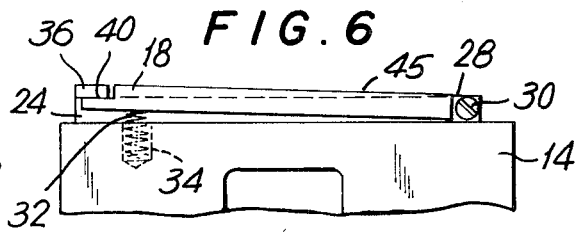
INVENTOR.
MAURICE GASTON LATREILLE
BY Leonard R. Kohan
ATTORNEY

DEVICE FOR CUTTING PARISONS

BACKGROUND OF THE INVENTION

This invention relates to a device for cutting a parison disposed between two mold halves of a blow molding machine and more particularly to a parison cutting device which is operable to cut parisons formed from a variety of plastic materials.

Heretofore, known parison cutting devices employing knives have not always performed satisfactorily, particularly when cutting heavier and tougher high temperature resin parisons such as those formed from XT Polymer, polyvinylchloride and the like. The heretofore unsatisfactory performance includes the inability of such known devices to shear the parison cleanly and consistently. When a blow molded article such as a bottle, is not cut from the succeeding bottle by the cutting device, the two articles drop onto a take-away conveyor together and frequently in such a way that the hot parison ends stick to other articles causing a jam on the take-away conveyor. This results in down time and additional operator effort thereby reducing the efficiency of the molding operation.

Accordingly, an object of the present invention is to overcome the aforesaid inefficiencies of prior art devices by providing a cutting device which is operable to efficiently cut a wide range of plastic materials including the heavier and tougher high temperature resins heretofore mentioned.

Another object is to provide a parison cutting device which is operable to consistently cut various parison materials cleanly.

A further object is to provide a cutting device having cutting blades arranged to produce a scissoring action operable to cut a parison disposed between the cutting blades.

A further object is to provide a cutting device having a biased cutting blade mounted on one mold and a cooperable blade fixed to another mold, the arrangement being such that when the molds are closed, the cooperable cutting action between the two blades is not impaired by mold misalignment.

Numerous other objects and advantages of the invention will be apparent as it is better understood from the following description, which, taken in connection with the accompanying drawings, discloses a preferred embodiment thereof.

SUMMARY OF THE INVENTION

A cutting device adapted to be mounted on relatively movable molds for cutting a parison disposed between the molds comprises a first cutting blade mounted on one of said molds and a second cutting blade pivotally mounted on the other mold for pivotal movement in a plane generally parallel to the parting plane of the molds. The second blade is biased in one pivotal direction to a predetermined position. The first and second cutting blades are disposed and arranged such that when the molds are moved to a closed position, the first blade engages the second blade to pivot the latter in opposition to the aforesaid bias and the two blades produce a scissoring action operable to cut the parison located between the two molds.

BRIEF DESCRIPTION OF THE DRAWING

FIG. 1 is a plan view of a parison cutting device, according to one embodiment of the invention, showing the two cutting blades in an open or spaced position with a parison therebetween.

FIG. 2 is a plan view similar to FIG. 1 but showing molds and the cutting blades in a closed position after the parison has been cut.

FIG. 3 is an elevational view of the parison and the two spaced cutting blades shown in FIG. 1.

FIG. 4 is a sectional view looking substantially along the line 4—4 in FIG. 2.

FIG. 5 is an elevational view of one of the cutting blades looking substantially along the line 5—5 in FIG. 3.

FIG. 6 is an elevational view of the other cutting blade looking substantially along the line 6—6 in FIG. 3.

DESCRIPTION OF THE PREFERRED EMBODIMENTS

Referring to the drawings, FIG. 1 shows a cutting device, according to one embodiment of the invention, for cutting a parison 10 after the latter has been disposed between two mold halves 12, 14 for the purpose of being blow molded in the mold halves. The cutting device comprises a pair of cutting blades 16, 18 mounted for movement with the two mold halves 12 and 14 respectively.

The cutting blade 16 is fixed to the mold half 12 and to this end, a spacer 20 is disposed on the mold half 12 and fasteners 22 pass through suitable openings in the cutting blade 10 and spacer 20 to threadedly engage the mold half 12. As an alternate arrangement the cutting blade 16 may be mounted on a suitable support block (not shown) and the latter in turn mounted on the mold half 12 by the use of fasteners. The mold half may also include a channel in which the support block is slid into position.

While the cutting blade 16 is fixedly mounted on the mold half 12, the other cutting blade 18 is pivotally mounted on the mold half 14, the mounting being such that the pivotal movement of the cutting blade 18 is in a plane generally parallel to the parting plane of the mold halves. To this end a back-up bar 24 is suitably fixed to the mold half 14 by fastener elements 26 which pass through suitable openings in the back-up bar 24 and threadedly engage the mold half 14. Here again, alternatively, the back-up bar 24 may be mounted on a suitable support block (not shown) and the latter in turn mounted on the mold half 14 by the fasteners 26. The mold half 14 may also include a channel in which the support block is slid into position.

The back-up bar 24 pivotally mounts the cutting blade 18 and to effect such pivotal mounting, one end of the cutting blade 18 is provided with a lug 28 having an opening in which a pivot 30 is received. The pivot pin 30 passes into an opening in the side of the back-up bar 24 at one longitudinal end portion of the latter and thereby supports the cutting blade 18 for pivotal movement in a plane generally parallel to the parting plane of the mold halves.

As can best be seen in FIG. 6, the cutting blade 18 is pivotally biased in a clockwise direction by a coil spring 32 having one end disposed against the cutting blade 18 and the other end disposed in a blind hole 34 in the mold half 14. If, as previously described, a support block (not shown) were used, the blind hole 34 would be disposed in the support block. A stop means in the form of a stop plate 36 is suitably secured to one longitudinal end of the back-up bar 24 by fasteners 38. The stop plate 36 has an end section which overhangs one longitudinal edge of the back-up bar 24 and which is adapted to engage the longitudinal end of the cutting blade 18 to limit the latter's maximum clockwise movement as shown in FIG. 6. The longitudinal end of the cutting blade 18 may have a section cut away as indicated at 40 in FIG. 6 where the cutting blade 18 engages the stop plate 36.

In the illustrated embodiment, the mold half 12 is adapted to be suitably reciprocally moved by a rod 42 which is operated by a power cylinder or the like (not shown). Thus the mold half 12 is displaced between an open position (FIG. 1) and a closed position (FIG. 2) relative to the mold half 14.

In operation, the parison 10 is formed and positioned in operative alignment with the two mold halves 12, 14 while the latter are in open position as shown in FIG. 1. The mold half 12 is then moved relative to the mold half 14 to commence closing of the molds. As the mold half 12 moves as aforesaid, the leading edge 43 of the cutting blade 16, which is disposed at an acute angle relative to its reciprocal path of travel, engages the parison 10. Generally the parison 10 is relatively soft as it is disposed between the mold halves, the degree of softness depending on various factors such as the type of plastic used and its temperature. The advancing blade 16 upon engaging the soft parison 10 will push the latter against the other blade 18 and will tend to flatten the parison 10. For example, in some cases the parison 10 may be flattened to a width equivalent to one and one-half times its original diameter.

As previously indicated, the leading edge or cutting edge of the blade 16 is disposed at an acute angle relative to its direction of reciprocal movement. Accordingly, the leading longitudinal end of blade 16 will initially engage the opposing cutting blade 18 before the trailing longitudinal end of blade 16. In this regard, the top surface of the pivotal blade 18 at the longitudinal end thereof adjacent the pivot pin 28 is disposed at a different elevation from the bottom surface of the leading longitudinal end 44 of the cutting blade 16. Thus the blade 16 is advanced to a position where its longitudinal end 44 will overlie the cutting blade 18 adjacent the pivotal end of the latter. It will be observed in FIG. 6, however, that the pivotal blade 18 in its normal position biased against the stop bar 36 is disposed at an acute angle relative to the general plane of the blade 16 and relative to the path of reciprocal involvement of the latter. Accordingly, once the longitudinal end 44 of blade 16 passes over the top surface of blade 18 and the blade 16 continues to advance, the advancing blade 16 will engage the pivotal blade 18, such engagement being made at the cutting edges 43, 45 of the two blades. After initial engagement and upon further advancement of blade 16, the latter will cause the blade 18 to pivot (in a counterclockwise direction as viewed in FIG. 6) as the cutting edges 43, 45 engage each other at a point moving across the longitudinal length of the cutting blades. Thus the blade 18 is progressively pivoted downwardly (as viewed in FIG. 6) in opposition to the bias of spring 32. The aforesaid engagement of the cutting edges along a moving point across the longitudinal length of the blades produces a scissoring action which cuts the parison 10. After the parison 10 has been cut and the parison 10 has been expanded in the mold to form a bottle or other article, the mold halves 12, 14 are separated and returned from their FIG. 2 to their FIG. 1 positions. As this occurs, the blade 16 disengages from blade 18 and the latter is returned to its initial position (FIGS. 1 and 6) ready to repeat another cycle of operation. It will be noted that because the cutting blade 18 is spring biased, the cooperable cutting action is not appreciably impaired by mold misalignment.

By way of example, the cutting blade 16 may have a shear angle of about 9° and a clearance angle of about 15°, while the pivotal blade 18 may have a 1/16-inch land and 10° relief angles.

It has been found that the cutting device of the present invention has been satisfactory not only for polyethylene but for tougher and high temperature resins such as XT Polymer (an acrylic multipolymer), polyvinylchloride and the like. The device of the present invention cuts parisons of the aforesaid materials cleanly and consistently and avoids problems caused by jams on the take-away conveyor resulting from hot parison ends sticking to other articles.

Although in the illustrated embodiment the mold half 12 and block 16 are reciprocally mounted relative to mold half 14 and blade 18, it will be understood that the mold half 14 and blade 18 may also be reciprocally mounted relative to mold half 12 and blade 16 and further, instead of being reciprocally mounted, either one or both of the mold halves may be pivotally mounted.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

What is claimed is:

1. A device for cutting a hot plastic parison disposed between relatively movable mold halves comprising:
   a pair of mold halves;
   a first straight edged cutting blade mounted on one of said mold halves;
   a second straight edged cutting blade;
   pivotal support means mounting said second cutting blade on the other mold half for pivotal movement in a plane generally parallel to the parting plane of said mold halves; and
   biasing means urging said second cutting blade in one pivotal direction to a predetermined pivotal position, said first and second cutting blades being disposed and arranged such that when said mold halves are moved to a closed position, said first blade engages said second blade to pivot the latter in opposition to said bias and said two blades produce a scissoring action operable to cut the parison.

2. A device according to claim 1 wherein said mold halves are relatively movable between an open and closed position, and wherein stop means are provided on said other mold half against which said second cutting blade is normally urged when said mold halves are in said open position, said stop means defining said predetermined pivotal position of said second cutting blade.

3. A device according to claim 1 wherein one of said mold halves is reciprocally mounted relative to the other, said first cutting blade have a leading cutting edge disposed at an acute angle relative to the path of reciprocal movement.

4. A device according to claim 3 wherein said second cutting blade has a cutting edge which is perpendicular to said path of reciprocal movement.

5. A device according to claim 1 wherein said first cutting blade is included in a general plane which intersects and extends generally perpendicularly to the parting plane of said mold halves.

6. A device according to claim 5 wherein said plane in which the first cutting blade is included overlies a portion of the second cutting blade located at the longitudinal end of the latter adjacent said pivotal support means when said second cutting blade is in said predetermined position.

7. A device according to claim 6 wherein said plane in which the first cutting blade is included intersects said second cutting blade at the longitudinal end of the latter remote from said pivotal support means when said second cutting blade is in said predetermined position.

8. A device according to claim 1 wherein said first and second cutting blades have cutting edges along which said blade engagement is effected, said cutting edges being disposed at an acute angle relative to one another.

9. A device according to claim 1 wherein said pivotal support means comprises a mounting element having a side section disposed generally in a plane parallel to the parting plane of the mold halves, and a pivot pin extending perpendicularly from said side section pivotally supporting said second cutting blade.

10. A device according to claim 9 further comprising stop means projecting beyond said side section of said mounting element into the path of pivotal movement of said second cutting blade.

* * * * *